(12) United States Patent
Yamaoki et al.

(10) Patent No.: US 10,700,631 B2
(45) Date of Patent: Jun. 30, 2020

(54) MOTOR TEMPERATURE ESTIMATION APPARATUS AND METHOD BY THE SAME

(71) Applicant: TOSHIBA TEC KABUSHIKI KAISHA, Shinagawa-ku, Tokyo (JP)

(72) Inventors: Toyoaki Yamaoki, Singapore (SG); Noriyuki Watanabe, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 16/210,041

(22) Filed: Dec. 5, 2018

(65) Prior Publication Data
US 2019/0181792 A1 Jun. 13, 2019

(30) Foreign Application Priority Data
Dec. 8, 2017 (JP) ................................. 2017-236385

(51) Int. Cl.
| | |
|---|---|
| *H02P 29/68* | (2016.01) |
| *H02P 8/00* | (2006.01) |
| *G06F 1/04* | (2006.01) |
| *G01K 7/42* | (2006.01) |
| *H02P 29/60* | (2016.01) |

(52) U.S. Cl.
CPC .............. *H02P 29/68* (2016.02); *G01K 7/427* (2013.01); *G06F 1/04* (2013.01); *H02P 8/00* (2013.01); *H02P 29/60* (2016.02)

(58) Field of Classification Search
CPC combination set(s) only.
See application file for complete search history.

(56) References Cited

U.S. PATENT DOCUMENTS

| | | | |
|---|---|---|---|
| 2010/0239277 A1 | 9/2010 | Mohri et al. | |
| 2014/0079453 A1* | 3/2014 | Arai | G03G 15/20 399/329 |
| 2014/0341626 A1* | 11/2014 | Mimbu | G03G 15/2017 399/329 |

* cited by examiner

*Primary Examiner* — Muhammad S Islam
(74) *Attorney, Agent, or Firm* — Amin, Turocy & Watson, LLP

(57) ABSTRACT

While a stepping motor for conveying a paper is being driven, a first clocking section enables a counting control section to add a first predetermined value to a count value each time a first predetermined period of time elapses. When the count value reaches a first threshold value, a motor stop determination section stops the motor. A second clocking section enables the counting control section to subtract a second predetermined value from the count value each time a second predetermined period of time elapses when the motor is stopped. When the count value falls below a second threshold value smaller than the first threshold value, a motor drive resuming section resumes the operation of the motor. A third clocking section enables the counting control section to subtract a third predetermined value from the count value each time a third predetermined period of time elapses when the stepping motor is stopped in a state in which the count value is smaller than the first threshold value.

20 Claims, 11 Drawing Sheets

MOTOR TEMPERATURE ESTIMATION APPARATUS AND METHOD BY THE SAME

CROSS-REFERENCE TO RELATED APPLICATION

This application is based upon and claims the benefit of priority from Japanese Patent Application No. 2017-236385, filed in Dec. 8, 2017, the entire contents of which are incorporated herein by reference.

FIELD

Embodiments described herein relate generally to a motor temperature estimation apparatus and a method by the same.

BACKGROUND

A conventional image forming apparatus has a function of estimating a surface temperature of a photoconductor based on a counting result by a counting module that performs addition when the photoconductor is being driven and performs subtraction when the photoconductor is stopped.

However, in such an image forming apparatus, regardless of a usage state of the image forming apparatus, when the photoconductor is stopped, the counting module performs the subtraction irrespective of the temperature of the photoconductor. Therefore, for example, there is a problem that an estimation error of the temperature may occur since a count value for estimating the temperature is added or subtracted in the same manner, even when the photoconductor is in an overheated state or when the temperature of the photoconductor is not high enough.

DETAILED DESCRIPTION

In accordance with an embodiment, a motor temperature estimation apparatus, which estimates a temperature of a motor rotating to output a driving force to convey a paper, comprises a counting module configured to increase or decrease a count value in response to an instruction; a first clocking module configured to output an instruction for adding a first predetermined value to a count value to the counting module each time a first predetermined period of time elapses when the motor is being driven; a determination module configured to stop the motor when the count value reaches a first threshold value; a second clocking module configured to output an instruction for subtracting a second predetermined value from the count value to the counting module each time a second predetermined period of time elapses when the motor is stopped according to a determination by the determination module; a resuming module configured to resume an operation of the motor when the count value changed based on the instruction from the second clocking module is smaller than a second threshold value, which is smaller than the first threshold value; and a third clocking module configured to output an instruction for subtracting a third predetermined value from the count value to the counting module each time a third predetermined period of time elapses when the motor is stopped in a state in which the count value is smaller than the first threshold value.

Hereinafter, a receipt printer provided with a motor temperature estimation apparatus according to an embodiment of the present invention is described with reference to the accompanying drawings.

(Description of Entire Structure of the Receipt Printer)

Figure 1:
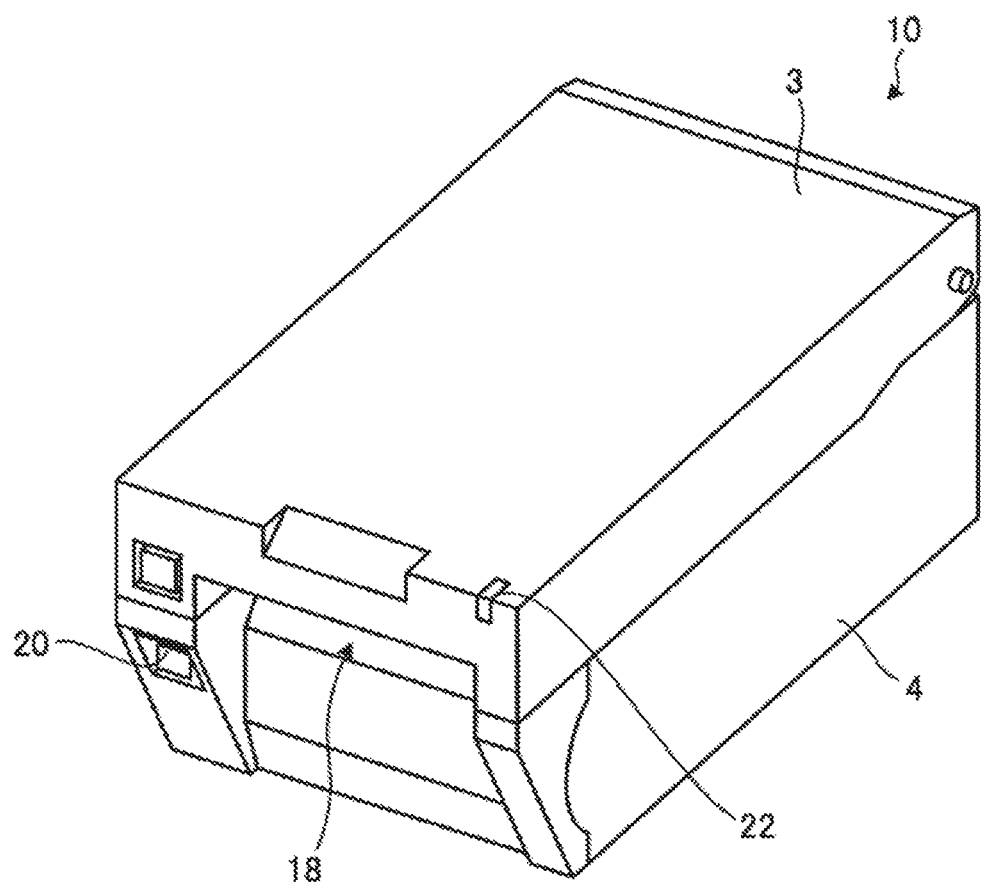
FIG. 1 is a perspective view illustrating an external appearance of a receipt printer of a motor temperature estimation apparatus according to an embodiment.

FIG. 1 is a perspective view illustrating an external appearance of a receipt printer 10 provided with a motor temperature estimation apparatus according to the present embodiment. The receipt printer 10 includes an upper casing 3, a lower casing 4, a paper discharge port 18, a power switch 20 and an indicator 22. The receipt printer 10 is an example of a printer apparatus.

Figure 2:
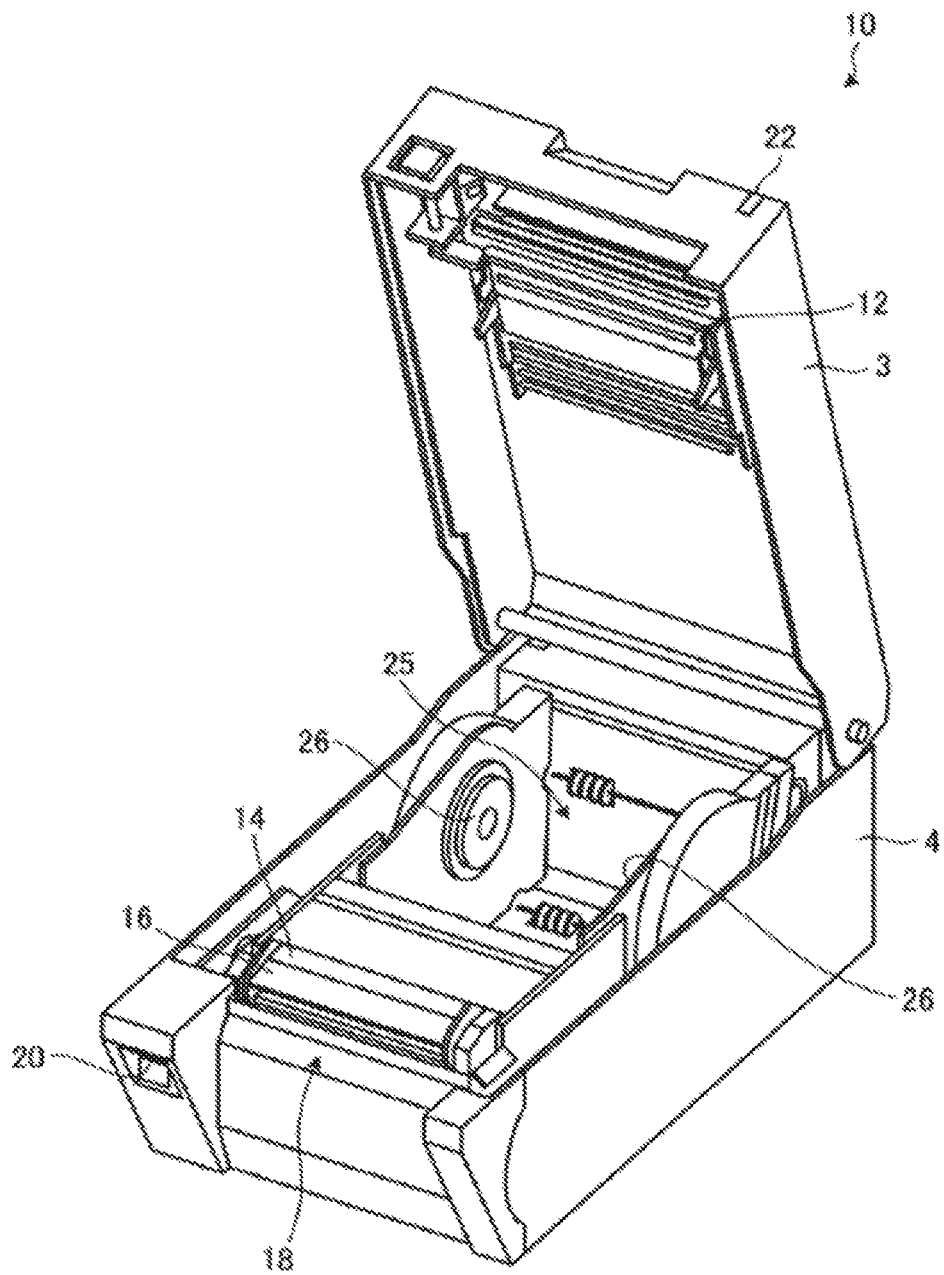
FIG. 2 is a perspective view illustrating a state in which an upper casing of the receipt printer is open.

FIG. 2 is a perspective view illustrating a state in which the upper casing 3 of the receipt printer 10 is open. The receipt printer 10 includes a thermal head 12, a platen roller 14, a cutter 16 and a paper housing section 25 therein.

The paper housing section 25 accommodates a roll paper (not shown) wound in a roll shape. The roll paper is formed by winding a thermal paper, which is an example of a paper, in the roll shape. The roll paper used in the present embodiment is obtained by winding a receipt paper. When printing is performed on the receipt paper, one end of the receipt paper is pulled out as the platen roller 14 rotates, and in this way, the receipt paper is conveyed from the paper housing section 25 to the paper discharge port 18 (refer to FIG. 3).

The receipt printer 10 of the present embodiment is used in a state in which a roll paper obtained by winding a thermal paper Q is loaded therein. At the center of the roll paper, a holding shaft (not shown) is installed. Both ends of the holding shaft are held by a holding section 26 shown in FIG. 2, respectively, and are accommodated and held in the paper housing section 25.

The lower casing 4 is a rectangular parallelepiped casing with an upper surface thereof open, and the upper surface thereof is closed by the upper casing 3. In the lower casing 4, a connection terminal (not shown) used for connecting the receipt printer 10 with an external device, a power terminal (not shown) for supplying electric power to the receipt printer 10, and the like are arranged.

The upper casing 3 is rotatably attached to the lower casing 4 at a side on the rear side thereof, and opens and closes the upper surface of the lower casing 4 as the upper casing 3 rotates.

Between a lower portion of a front end of the upper casing 3 and an upper portion of a front end of the lower casing 4, the paper discharge port 18 for discharging the thermal paper Q is provided.

The power switch 20 is pressed down to turn on or off a power supply of the receipt printer 10. The indicator 22 is, for example, an LED (Light Emitting Diode), and lights up or flashes to indicate a state of the receipt printer 10 which includes a power-on state and the like.

The indicator 22 also functions as a notifying module. Specifically, the indicator 22 notifies the state of the receipt printer 10, such as a state in which a stepping motor 24 is temporarily stopped due to overheating. Details are described later.

In the receipt printer 10, the thermal head 12 is fixed to an inner surface of the upper casing 3, and contacts with the platen roller 14 in a state in which the upper casing 3 is closed.

The thermal head 12 includes a plurality of heating elements, and performs printing on the thermal paper Q sandwiched between the thermal head 12 and the platen roller 14 with heat generated by the heating element. Specifically, the thermal head 12 has a structure in which a plurality of heating elements is installed on a glass substrate or a ceramic substrate. The thermal head 12 performs printing on the thermal paper Q by enabling the heating element at a position corresponding to print data to generate heat among the plurality of heating elements.

Figure 3:
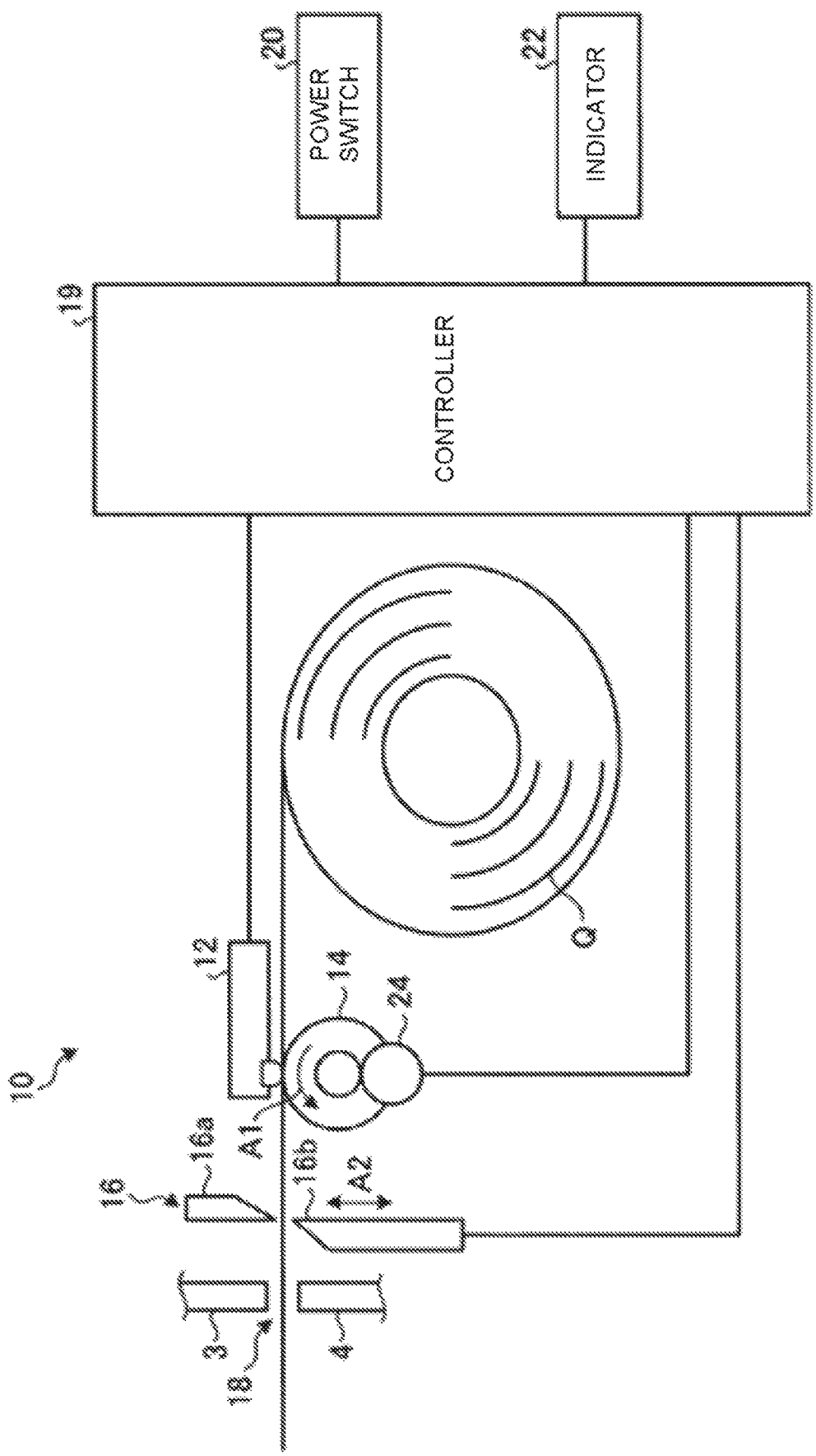
FIG. 3 is a cross-sectional view illustrating an example of an internal structure of the receipt printer.

The platen roller 14 is rotated by a rotational driving force from the stepping motor 24 (refer to FIG. 3). The platen roller 14 rotates to convey the thermal paper Q sandwiched between the platen roller 14 and the thermal head 12 from the paper housing section 25 on the upstream side to the paper discharge port 18 on the downstream side. Details are described later.

The cutter 16 cuts the printed thermal paper Q.

(Description of Conveyance Path of Receipt Paper)

Next, an internal structure of the receipt printer 10 is described with reference to FIG. 3. FIG. 3 is a cross-sectional view illustrating an example of the internal structure of the receipt printer 10.

As shown in FIG. 3, an operator of the receipt printer 10 opens the above upper casing 3, pulls out a front end of the thermal paper Q from the roll paper, and enables the thermal paper Q to be sandwiched between the thermal head 12 and the platen roller 14. If the stepping motor 24 is rotated after closing the upper casing 3 in this state, the platen roller 14 rotates in a direction indicated by an arrow A1 (counter-clockwise) as the stepping motor 24 rotates. The stepping motor 24 is an example of a motor. As the platen roller 14 rotates, the thermal paper Q is conveyed from the paper housing section 25 on the upstream side to the paper discharge port 18 on the downstream side.

The thermal paper Q passes between the thermal head 12 and the platen roller 14, and then reaches the cutter 16. As shown in FIG. 3, the cutter 16 includes an upper blade 16a which is a fixed blade and a lower blade 16b which is a movable blade. The lower blade 16b is moved in a vertical direction (in a direction indicated by an arrow A2) by a stepping motor (not shown in FIG. 3) driven to rotate according to an instruction from a controller 19, and in this way, the thermal paper Q is sandwiched between the upper blade 16a and the lower blade 16b to be cut.

The cut thermal paper Q is discharged from the paper discharge port 18 formed in a gap between the upper casing 3 and the lower casing 4.

The controller 19 of the receipt printer 10 is an example of the motor temperature estimation apparatus and has a general computer configuration, and executes the control program P1 stored therein to control the operation of the entire receipt printer 10. That is, the controller 19 receives the print data from the POS terminal 80 (refer to FIG. 4) connected to the receipt printer 10, and executes a printing operation.

The controller 19 monitors the state of the power switch 20 and controls the indicator 22.

(Description of Hardware Configuration of the Controller)

Figure 4:
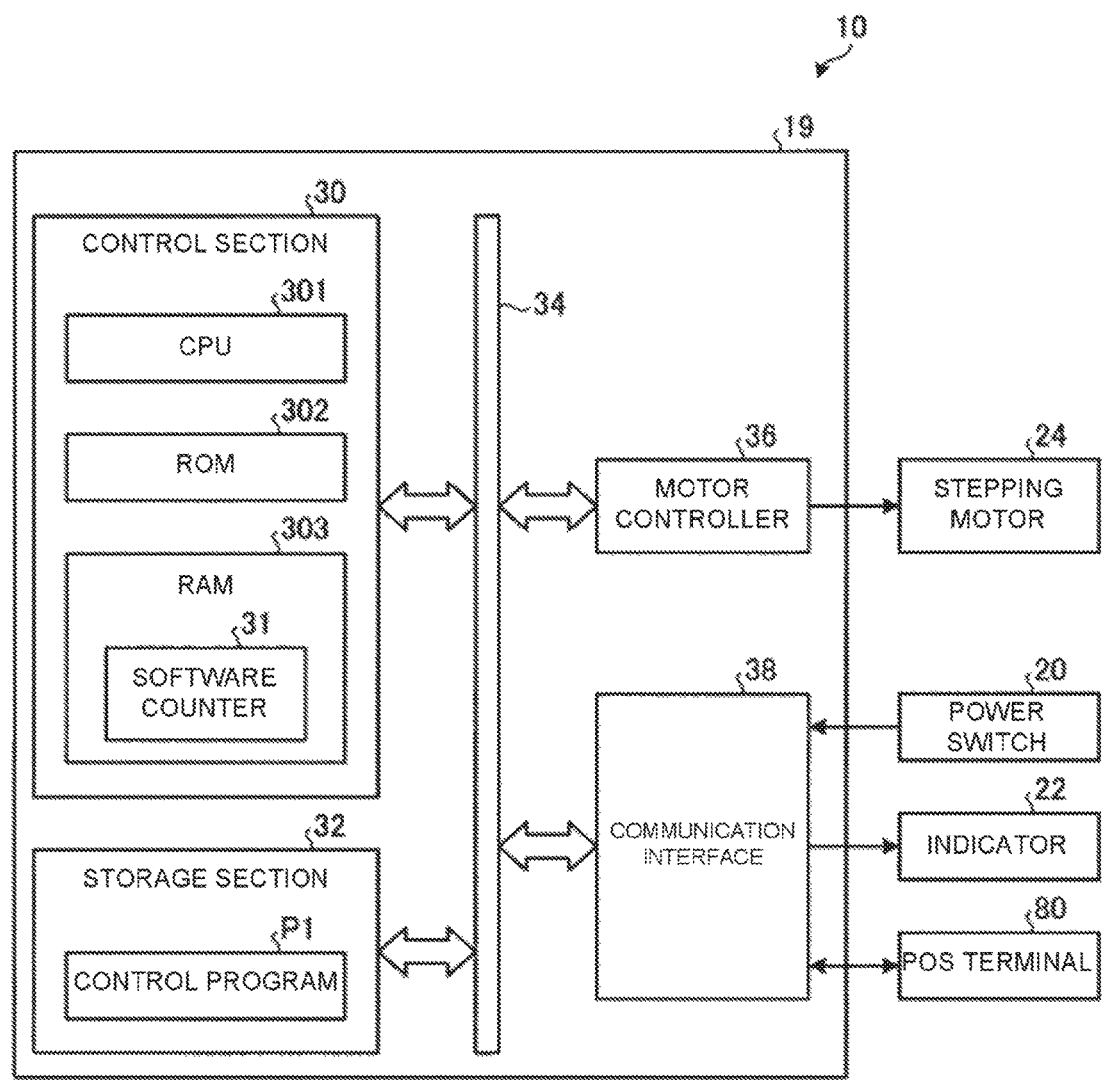
FIG. 4 is a hardware block diagram illustrating an example of a hardware configuration of a controller of the receipt printer.

Next, the hardware configuration of the controller 19 of the receipt printer 10 is described with reference to FIG. 4. FIG. 4 is a hardware block diagram illustrating an example of the hardware configuration of the controller 19 of the receipt printer 10.

The controller 19 of the receipt printer 10 has a general computer configuration in which a control section 30 and a storage section 32 are connected with each other via an internal bus 34. The controller 19 controls the operation of each section of the receipt printer 10 by an operation of the control section 30 provided therein. The control section 30 includes a CPU (Central Processing Unit) 301, a ROM (Read Only Memory) 302, and a RAM (Random Access Memory) 303.

The CPU 301 controls the operation of each section of the receipt printer 10. The ROM 302 stores fixed data such as various programs to be executed by the CPU 301 and various kinds of data. The CPU 301 includes a timer counter, and has a clocking function using the timer counter. The RAM 303 temporarily stores various kinds of data and programs when the CPU 301 executes various programs. The RAM 303 includes a software counter 31 for storing a value corresponding to an operation time of the stepping motor 24 used for estimating the temperature of the stepping motor 24, and increasing or decreasing a count value C according to an operation of software. Details of the software counter 31 are described later.

The storage section 32 is, for example, an HDD (Hard Disk Drive), and stores a control program P1 and the like to be executed by the CPU 301.

A motor controller 36 and a communication interface 38 are connected to the internal bus 34. The motor controller 36 drives the stepping motor 24 by applying a drive pulse to the stepping motor 24. The communication interface 38 is connected to a POS (Point of Sale) terminal 80 to receive printing information indicating contents of information to be printed by the receipt printer 10 from the POS terminal 80. The communication interface 38 is connected to the power switch 20 of the receipt printer 10 to receive information indicating that the power switch 20 is operated. The communication interface 38 is connected to the indicator 22 to display a state of the receipt printer 10 which includes the power-on state and the like.

(Description of Functional Components of the Motor Temperature Estimation Apparatus)

Figure 5:
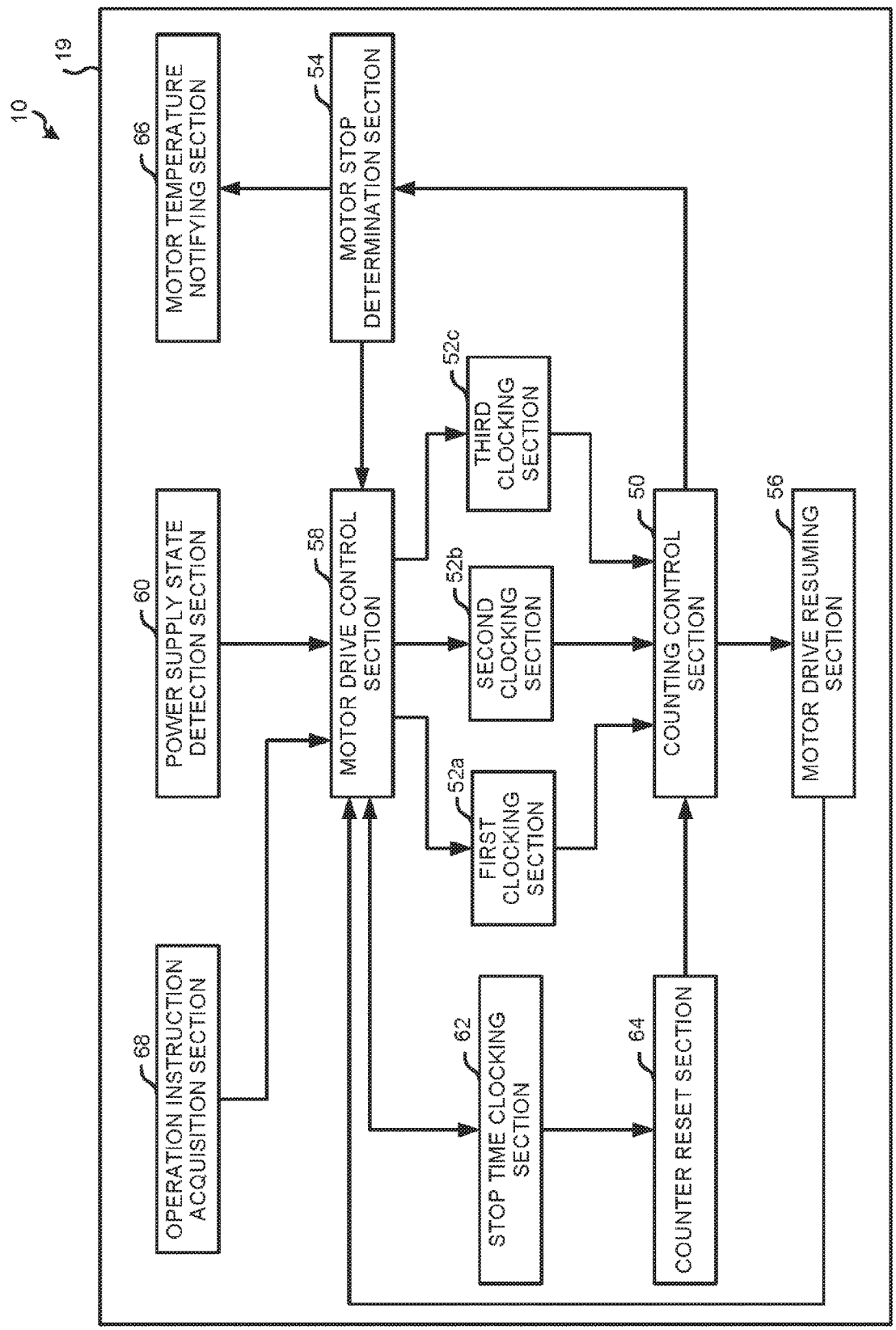
FIG. 5 is a functional block diagram illustrating an example of functional components of the controller.

Next, with reference to FIG. 5, the functional components of the controller 19 which is an example of the motor temperature estimation apparatus are described. FIG. 5 is a functional block diagram illustrating an example of the functional components of the controller 19.

The CPU 301 (refer to FIG. 4) of the controller 19 copies or decompresses the control program P1 in the storage section 32 on the RAM 303. The controller 19 operates according to the control program P1 to generate each functional section shown in FIG. 5 on the RAM 303.

Specifically, the controller 19 functions as a counting control section 50, a first clocking section 52a, a second clocking section 52b, a third clocking section 52c, a motor stop determination section 54, a motor drive resuming section 56, a motor drive control section 58, a power supply state detection section 60, a stop time clocking section 62, a counter reset section 64, a motor temperature notifying section 66 and an operation instruction acquisition section 68.

The counting control section 50 increases or decreases a count value C (refer to FIG. 6) by the software counter 31 formed in the RAM 303 in response to an instruction from the first clocking section 52a, the second clocking section 52b, or the third clocking section 52c described later. The counting control section 50 is an example of a counting module. The count value C indicates an estimated temperature of the stepping motor 24.

While the motor is being driven, the first clocking section 52a outputs an instruction for adding a first predetermined value c1 (refer to FIG. 6) to the count value C by the software counter 31 to the counting control section 50 each time a first predetermined period of time ta (refer to FIG. 6) elapses. The first clocking section 52a is an example of a first clocking module. For example, the first predetermined period of time ta is a timing at which a pulse signal for driving the stepping motor 24 is applied, or a timing at which an interrupt signal that the timer counter of the CPU 301 outputs at a predetermined time interval corresponding to an interval of a pulse signal for driving the stepping motor 24 is applied.

When the stepping motor 24 is stopped according to determination by the motor stop determination section 54, the second clocking section 52b outputs an instruction for subtracting a second predetermined value c2 (refer to FIG. 6) from the count value C by the software counter 31 to the counting control section 50 each time a second predetermined period of time tb (refer to FIG. 6) elapses. The second clocking section 52b is an example of a second clocking module. The second predetermined period of time tb is set to an appropriate time interval in advance by, for example, observing fall of the temperature of the stepping motor 24 with time after the heated stepping motor 24 is placed as it is actually. Then, the second clocking section 52b detects that the set second predetermined period of time tb has elapsed by monitoring the output from the timer counter of the CPU 301. The second predetermined value c2 is set to the same value as the first predetermined value c1.

When the stepping motor 24 is stopped in a state in which the count value C by the software counter 31 is smaller than a first threshold value Th1 (refer to FIG. 6), for example, when the printing of a receipt is completed, the third clocking section 52c outputs an instruction of subtracting a third predetermined value c3 from the count value C by the software counter 31 to the counting control section 50 each time a third predetermined period of time tc (refer to FIG. 6) elapses. The first threshold value Th1 indicates an allowable limit, and if the temperature rises beyond the allowable limit, the stepping motor 24 may be damaged. The third clocking section 52c is an example of a third clocking module. Similarly to the above second predetermined period of time tb, the third predetermined period of time tc is set to an appropriate time interval in advance by measuring change of temperature when the heated stepping motor 24 is placed as it is. Then, the third clocking section 52c detects that the set third predetermined period of time tc has elapsed by monitoring the output from the timer counter of the CPU 301. The third predetermined value c3 is set to the same value as the first predetermined value c1 and the second predetermined value c2.

When the count value C by the software counter 31 reaches the first threshold value Th1, the motor stop determination section 54 stops the stepping motor 24. The motor stop determination section 54 determines that the printing of the receipt has terminated and stops the stepping motor 24.

When the stepping motor 24 is stopped according to the determination by the motor stop determination section 54, if the count value C by the software counter 31 changed based on the instruction of the second clocking section 52b is smaller than a second threshold value Th2 (refer to FIG. 6) which is smaller than the first threshold value Th1, the motor drive resuming section 56 resumes the operation of the stepping motor 24. If the temperature of the stepping motor 24 falls to the second threshold value Th2, it can be determined that the stepping motor 24 can be operated without any problem.

The motor drive control section 58 controls the operation of the stepping motor 24. The motor controller 36 in FIG. 4 is an example of the motor drive control section 58.

The power supply state detection section 60 detects whether the power supply of the receipt printer 10 is turned on by detecting the state of the power switch 20.

The stop time clocking section 62 measures a power supply disconnection period of time "to" from a moment at which the power supply of the receipt printer 10 is turned off to a moment at which the power supply is turned on.

The counter reset section 64 resets the count value C by the software counter 31 to 0 when the power supply disconnection period of time to measured by the stop time clocking section 62 is equal to or longer than a predetermined period of time set in advance. Specifically, the counter reset section 64 forcibly resets the count value C when it can be determined that the stepping motor 24 is completely cooled.

The motor temperature notifying section 66 performs notification by enabling the indicator 22 to light up or flash while the stepping motor 24 is stopped according to the determination by the motor stop determination section 54. By the notification, the operator of the receipt printer 10 is notified that the operation of the stepping motor 24 is stopped due to overheating. At this time, if the temperature of the stepping motor 24 falls, the receipt printer 10 may display a message indicating that the operation is automatically resumed on a display screen of the POS terminal 80 connected to the receipt printer 10.

The operation instruction acquisition section 68 acquires an operation instruction to the receipt printer 10 among various operations performed in the receipt printer 10 and the POS terminal 80.

(Description of Operation Outline of the Motor Temperature Estimation Apparatus)

Figure 6:
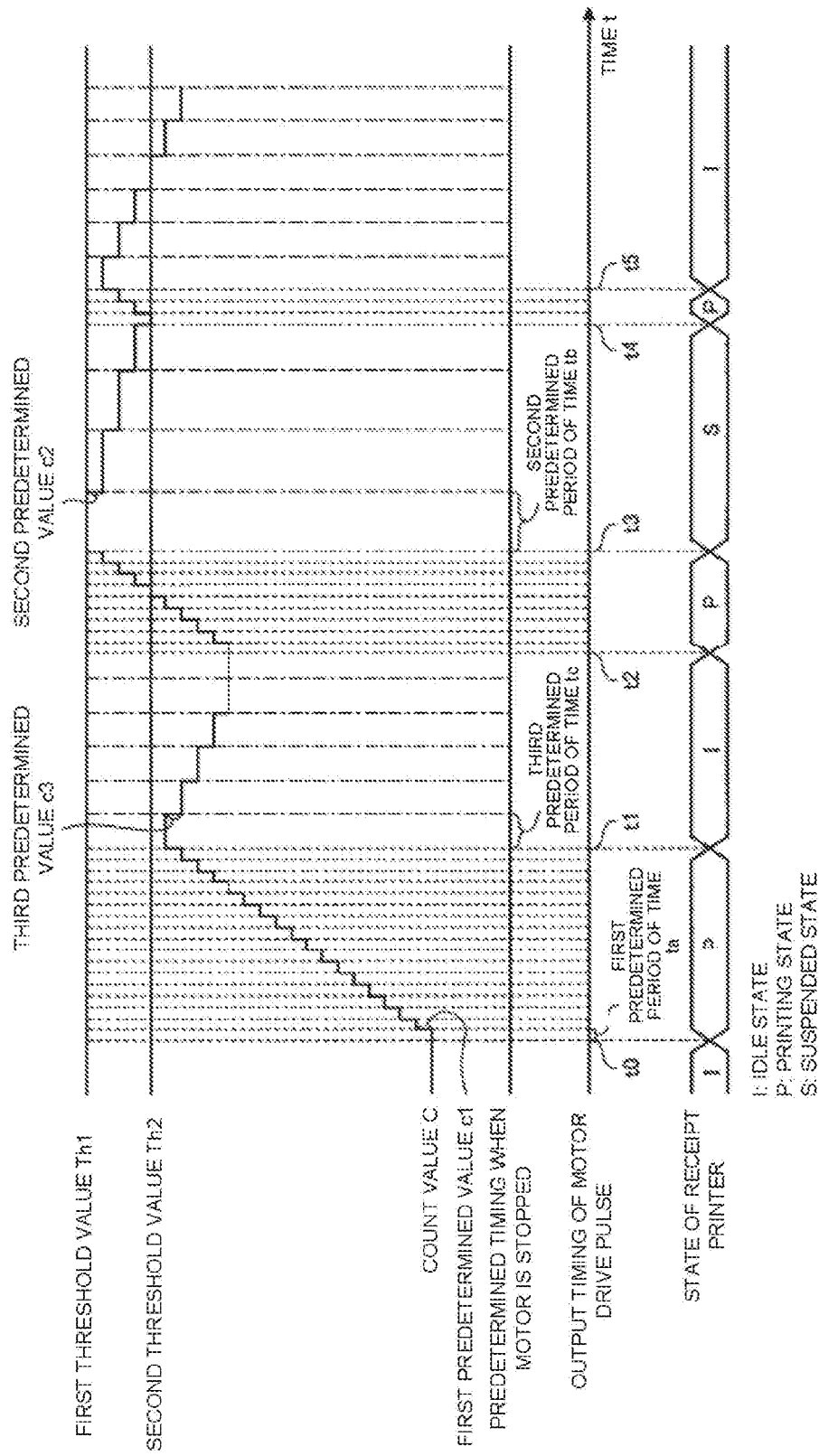
FIG. 6 is a graph schematically illustrating an example of an operation outline of the motor temperature estimation apparatus.

Next, an operation outline of a motor temperature estimation apparatus 19 is described with reference to FIG. 6. FIG. 6 is a graph illustrating an example of the operation outline of the motor temperature estimation apparatus 19. A horizontal axis of the graph indicates a time t, and a vertical axis of the graph indicates the count value C by the software counter 31.

The motor temperature estimation apparatus 19 estimates the temperature of the stepper motor 24 and sets the state of the receipt printer 10 to any one of a printing state P, an idle state I and a suspended state S based on the estimated temperature.

In the printing state P, the receipt printer 10 prints a receipt. In the example in FIG. 6, the printing state P is a state in a period from a time t0 to a time t1, a period from a time t2 to a time t3, and a period from a time t4 to a time t5. In FIG. 6, in the period from the time t0 to the time t1, a receipt relating to one transaction is printed. In the period from the time t2 to the time t3, the stepping motor 24 is stopped to stop the printing operation and the conveyance of the receipt paper since the temperature of the stepping motor 24 reaches the first threshold value Th1 in the printing of the receipt relating to one transaction. In the period from time t4 to time t5, the operation of the stepping motor 24 is resumed to resume the printing and the conveyance of the receipt at the time t4 and the printing of the receipt is completed at the time t5.

In the idle state I, the count value C by the software counter 31 does not reach the first threshold value Th1, and the receipt printer 10 does not print the receipt. In the example in FIG. 6, the idle state I refers to a state in a period from the time t1 to time t2 and a period after the time t5.

In the suspended state S, the count value C by the software counter 31 reaches the first threshold value Th1 and the printing and the conveyance of the receipt paper in the receipt printer 10 are stopped. In the example in FIG. 6, the suspended state S is a state in a period from the time t3 to the time t4.

When the receipt printer 10 is in the printing state P, each time the above first clocking section 52a (refer to FIG. 5) detects that the first predetermined period of time to has elapsed, the counting control section 50 increases the count value C by the software counter 31 by the first predetermined value c1.

When the receipt printer 10 is in the idle state I, each time the above third clocking section 52c (refer to FIG. 5) detects that the third predetermined period of time tc has elapsed, the counting control section 50 subtracts the count value C by the software counter 31 by the third predetermined value c3.

When the receipt printer 10 is in the suspended state S, each time the above second clocking section 52b (refer to FIG. 5) detects that the second predetermined period of time tb has elapsed, the counting control section 50 subtracts the count value C by the software counter 31 by the second predetermined value c2. Here, the second predetermined period of time tb is set to a period of time longer than the third predetermined period of time tc. Specifically, when the receipt printer 10 is in the suspended state S, the time at which the count value C by the software counter 31 is subtracted is set to be later than that in the idle state I. This is because more time is required for cooling the stepping motor 24 since the temperature of the stepping motor 24 in the suspended state S is higher than that of the stepping motor 24 in the idle state I.

Even if the third predetermined period of time tc and the second predetermined period of time tb are set to the same value, and the third predetermined value c3 is set to be greater than the second predetermined value c2, the same characteristics can be obtained.

(Description of State Transition of the Receipt Printer)

Figure 7:
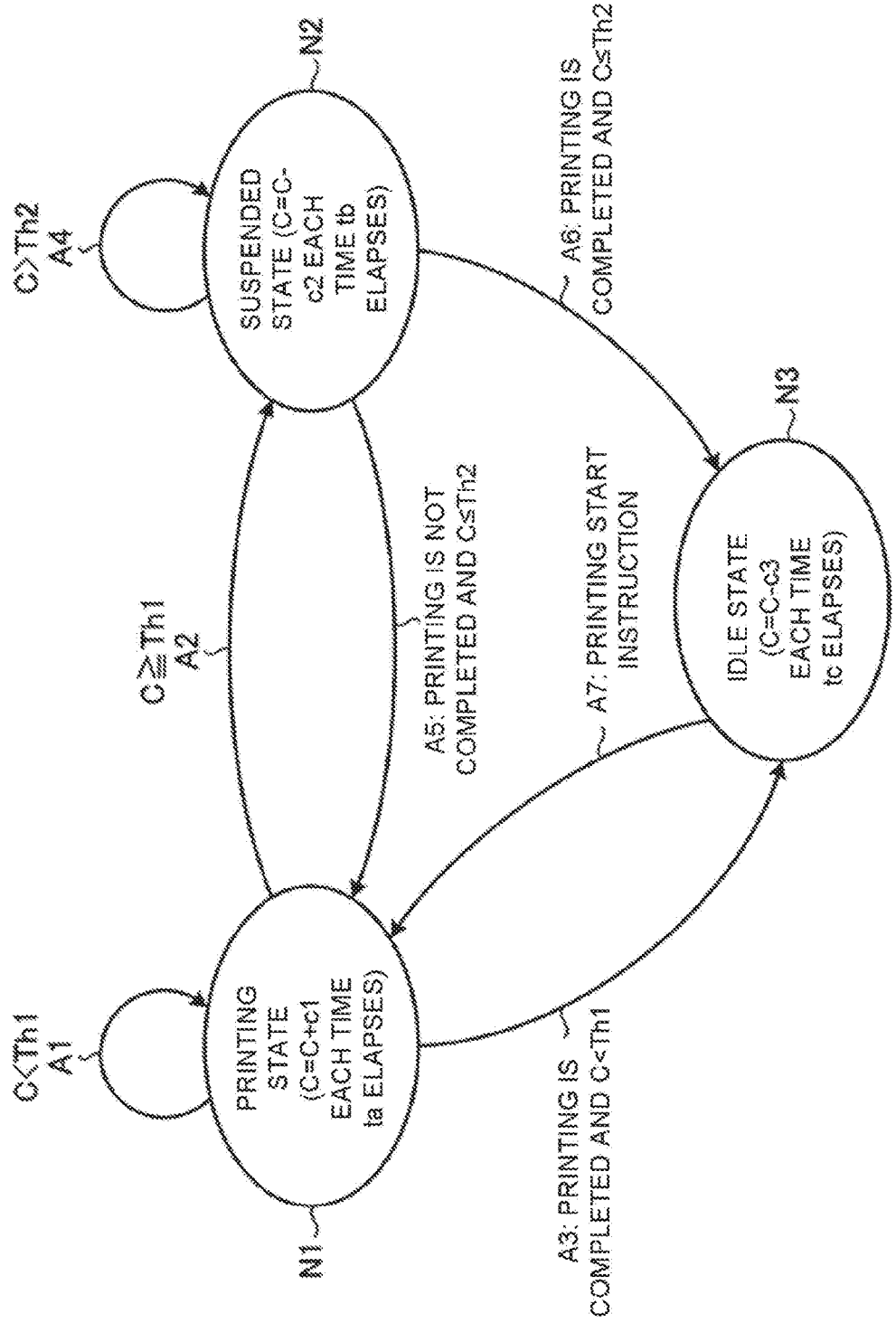
FIG. 7 is a diagram illustrating transition of a state of the receipt printer.

Next, the transition of the state of the receipt printer 10 is described with reference to FIG. 7. FIG. 7 is a state transition diagram illustrating the state transition of the receipt printer 10.

If the receipt printer 10 is in the printing state P (node N1), the count value C is increased by the first predetermined value c1 every time the first predetermined period of time to elapses. Then, if the count value C is C<Th1, the receipt printer 10 maintains the printing state P (arc A1). If the count value C is C≥Th1, the state of the receipt printer 10 shifts to the suspended state S (arc A2). Furthermore, if the printing of the receipt is completed and the count value C is C<Th1, the state of the receipt printer 10 shifts to the idle state I (arc A3).

If the receipt printer 10 is in the suspended state S (node N2), the count value C is subtracted by the second predetermined value c2 every time the second predetermined period of time tb elapses. Then, if the count value C is C>Th2, the receipt printer 10 maintains the suspended state S (arc A4). If the printing of receipt is not completed and the count value C is C≤Th 2, the state of the receipt printer 10 shifts to the printing state P (arc A5). Furthermore, if the printing of the receipt is completed and the count value C is C≤Th2, the state of receipt printer 10 shifts to the idle state I (arc A6).

If the receipt printer 10 is in the idle state I (node N3), the count value C is subtracted by the third predetermined value c3 every time the third predetermined period of time tc elapses. If the start of the printing of the receipt is instructed according to the operation of the receipt printer 10 or the instruction from the POS terminal 80, the state of the receipt printer 10 shifts to the printing state P (arc A7).

(Description of Flow of Processing Performed by the Motor Temperature Estimation Apparatus)

Figure 8:
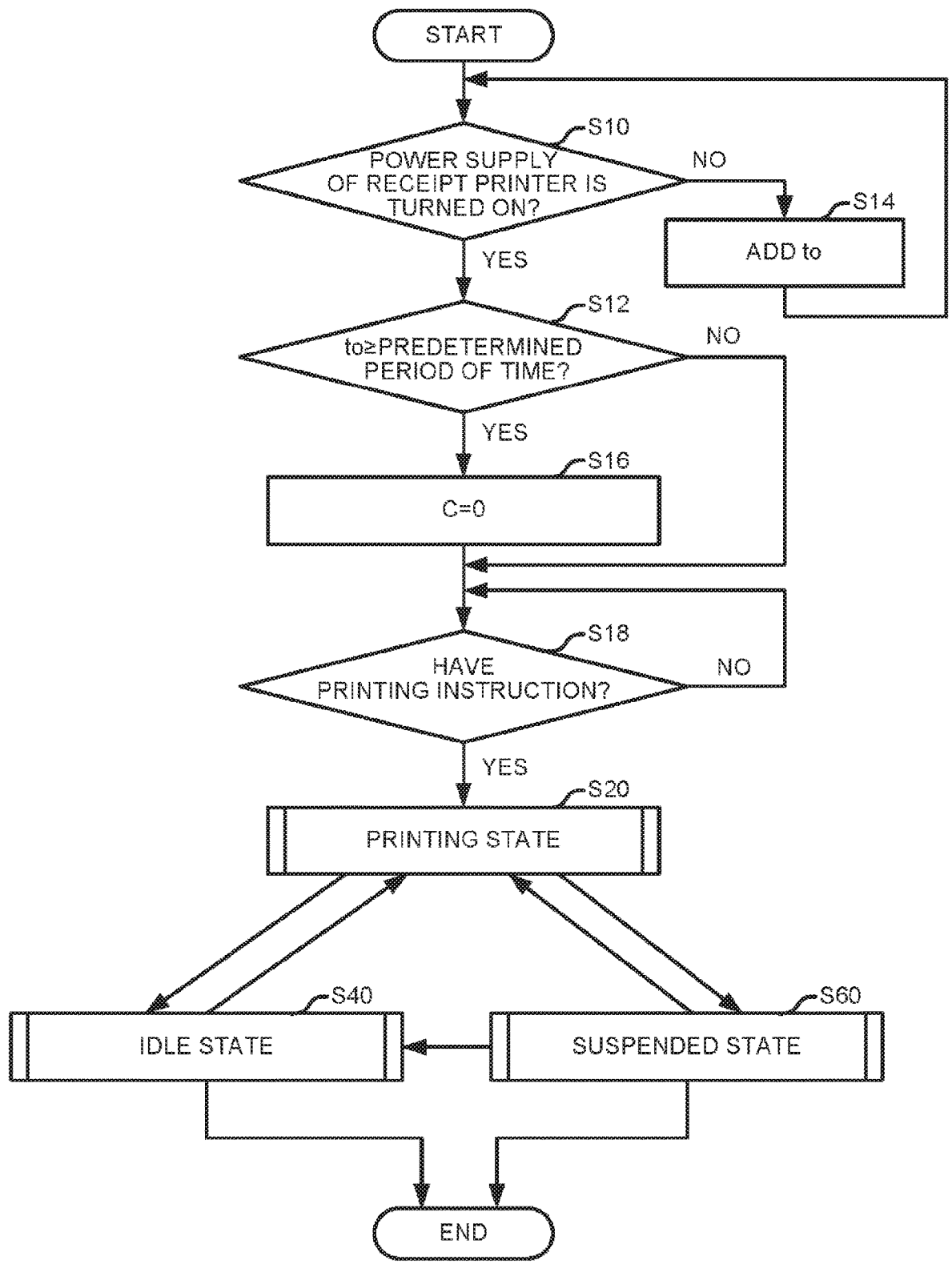
FIG. 8 is a flowchart depicting an example of a flow of a processing performed by the motor temperature estimation apparatus.

Next, with reference to FIG. 8, a flow of a processing performed by the control section 30 of the motor temperature estimation apparatus 19 based on the control program P1 is described. FIG. 8 is a flowchart depicting an example of the flow of a processing performed by the motor temperature estimation apparatus 19.

The power supply state detection section 60 determines whether the power supply of the receipt printer 10 is turned on (Act S10). If it is determined that the power supply of the receipt printer 10 is turned on (Yes in Act S10), the flow proceeds to the processing in Act S12. On the other hand, if it is determined that the power supply of the receipt printer 10 is not turned on (No in Act S10), the flow proceeds to the processing in Act S14, and the stop time clocking section 62 adds a power supply disconnection period of time to from the time the power supply of the receipt printer 10 is turned off to the time the power supply is turned on. Thereafter, the flow returns to the processing in Act S10.

Next, in Act S12, the counter reset section 64 determines whether the power supply disconnection period of time to is equal to or longer than a predetermined period of time set in advance. If it is determined that the power supply disconnection period of time to is equal to or longer than the predetermined period of time set in advance (Yes in Act S12), the flow proceeds to the processing in Act S16 to reset the count value C to 0. Thereafter, the flow proceeds to the processing in Act S18. On the other hand, if it is determined that the power supply disconnection period of time to is shorter than the preset predetermined period of time (No in Act S12), the flow proceeds to the processing in Act S18.

Subsequently, the operation instruction acquisition section 68 determines whether there is a printing instruction (Act S18). If it is determined that there is a printing instruction (Yes in Act S18), the counting control section 50 changes the state of the receipt printer 10 to the printing state P (Act S20). On the other hand, if it is determined that there is no printing instruction (No in Act S18), the processing in Act S18 is repeated.

After the state of the receipt printer 10 shifts to the printing state P, the counting control section 50 respectively changes the state of the receipt printer 10 to the idle state I (Act S40) and the suspended state S (Act S60) based on the count value C. The flow of the processing in each state is described later.

(Description of Flow of Processing in the Printing State)

Figure 9:
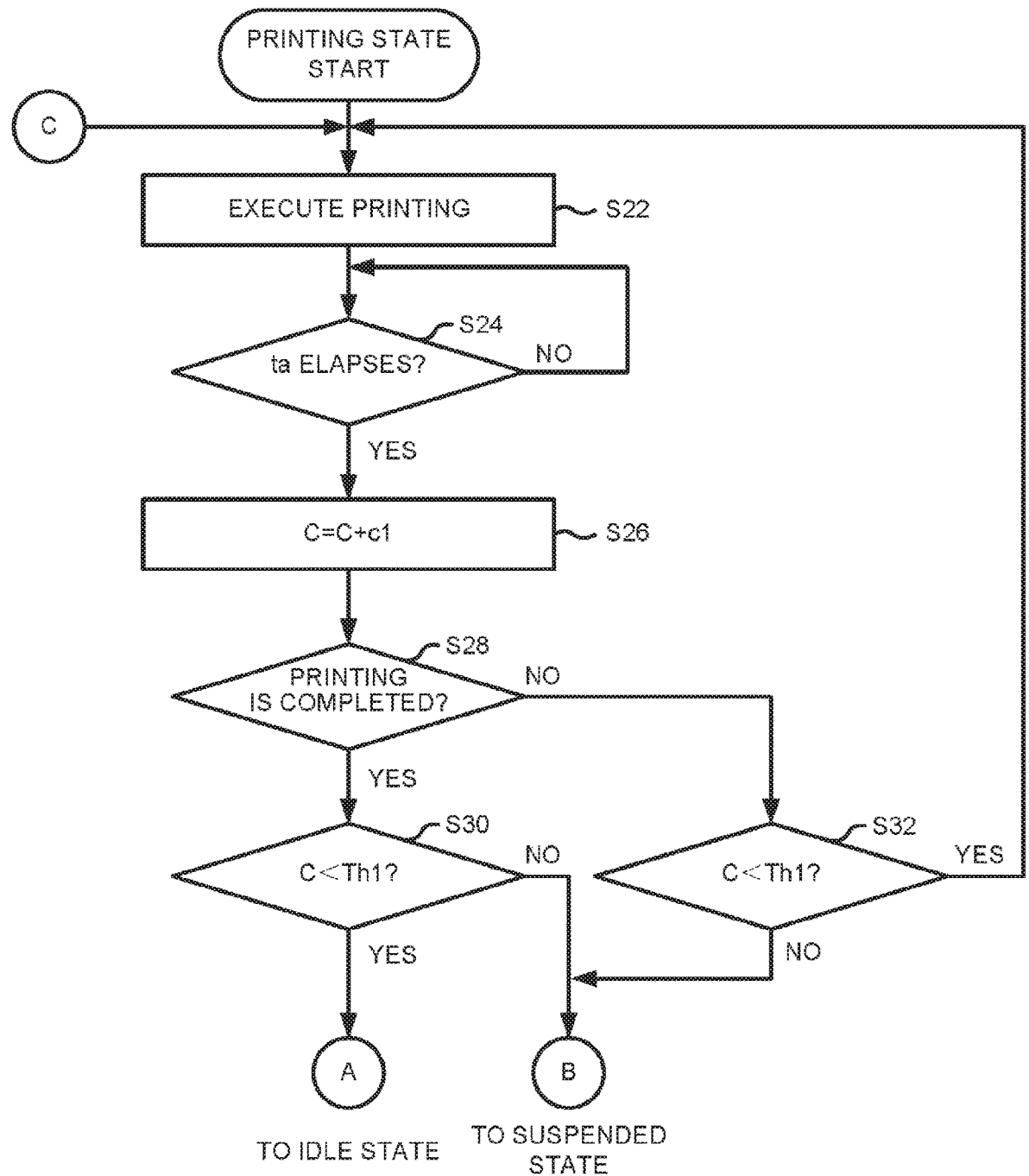
FIG. 9 is a flowchart depicting an example of a flow of a processing in a printing state.

Next, a flow of the processing in the printing state P is described with reference to FIG. 9. FIG. 9 is a flowchart depicting an example of the flow of the processing in the printing state P. if the state of the receipt printer 10 shifts to the printing state P, the receipt printer 10 executes printing of the receipt (Act S22).

The first clocking section 52a determines whether the first predetermined period of time ta elapses (Act S24). If it is determined that the first predetermined period of time ta has elapsed (Yes in Act S24), the flow proceeds to the processing in Act S26. On the other hand, if it is determined that the first predetermined period of time ta does not elapse (No in Act S24), the processing in Act S24 is repeated.

The counting control section 50 adds the first predetermined value c1 to the count value C (Act S26).

Subsequently, the motor stop determination section 54 determines whether the printing (printing of the receipt) is completed. If it is determined that the printing has been completed (Yes in Act S28), the flow proceeds to the processing in Act S30. On the other hand, if it is determined that the printing is not completed (No in Act S28), the flow proceeds to the processing in Act S32.

In Act S30, the motor stop determination section 54 determines whether the count value C is smaller than the first threshold value Th1. If it is determined that the count value C is smaller than the first threshold value Th1 (Yes in Act S30), the counting control section 50 changes the state of the receipt printer 10 to the idle state I (Act S42 in FIG. 10). On the other hand, if it is determined that the count value C is not smaller than the first threshold value Th1 (No in Act S30), the counting control section 50 changes the state of the receipt printer 10 to the suspended state S (Act S62 in FIG. 11).

In Act S32, the motor stop determination section 54 determines whether the count value C is smaller than the first threshold value Th1. If it is determined that the count value C is smaller than the first threshold value Th1 (Yes in Act S32), the flow returns to the processing in Act S22. On the other hand, if it is determined that the count value C is not smaller than the first threshold value Th1 (No in Act S32), the counting control section 50 changes the state of the receipt printer 10 to the suspended state S (Act S62 in FIG. 11).

(Description of Flow of Processing in the Idle State)

Figure 10:
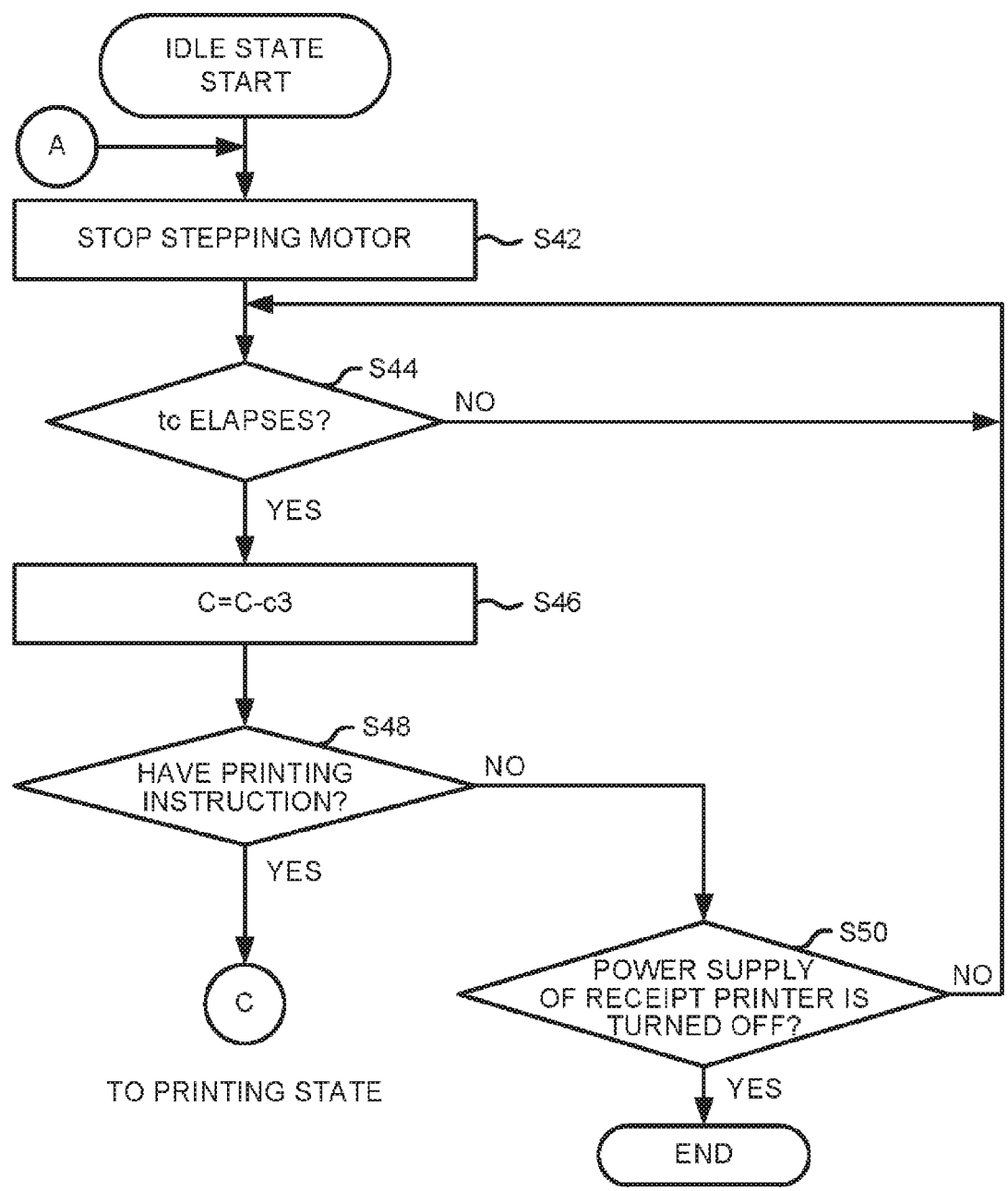
FIG. 10 is a flowchart depicting an example of a flow of a processing in an idle state.

Next, the flow of the processing in the idle state I is described with reference to FIG. 10. FIG. 10 is a flowchart depicting an example of the flow of the processing in the idle state I. If the state of the receipt printer 10 shifts to the idle state I, the counting control section 50 enables the motor drive control section 58 to stop the stepping motor 24 (Act S42).

The third clocking section 52c determines whether the third predetermined period of time tc elapses (Act S44). If it is determined that the third predetermined period of time tc has elapsed (Yes in Act S44), the flow proceeds to the processing in Act S46. On the other hand, if it is determined that the third predetermined period of time tc does not elapse (No in Act S44), the processing in Act S44 is repeated.

The counting control section 50 subtracts the third predetermined value c3 from the count value C (Act S46).

Subsequently, the operation instruction acquisition section 68 determines whether there is a printing instruction (Act S48). If it is determined that there is a printing instruction (Yes in Act S48), the state of the receipt printer 10 shifts to the printing state P (Act S22 in FIG. 9). On the other hand, if it is determined that there is no printing instruction (No in Act S48), the flow proceeds to the processing in Act S50.

In Act S50, the power supply state detection section 60 determines whether the power supply of the receipt printer 10 is turned off. If it is determined that the power supply of the receipt printer 10 is turned off (Yes in Act S50), the processing in FIG. 10 is terminated. On the other hand, if it is determined that the power supply of the receipt printer 10 is not turned off (No in Act S50), the flow returns to the processing in Act S44.

(Description of Flow of Processing in the Suspended State)

Figure 11:
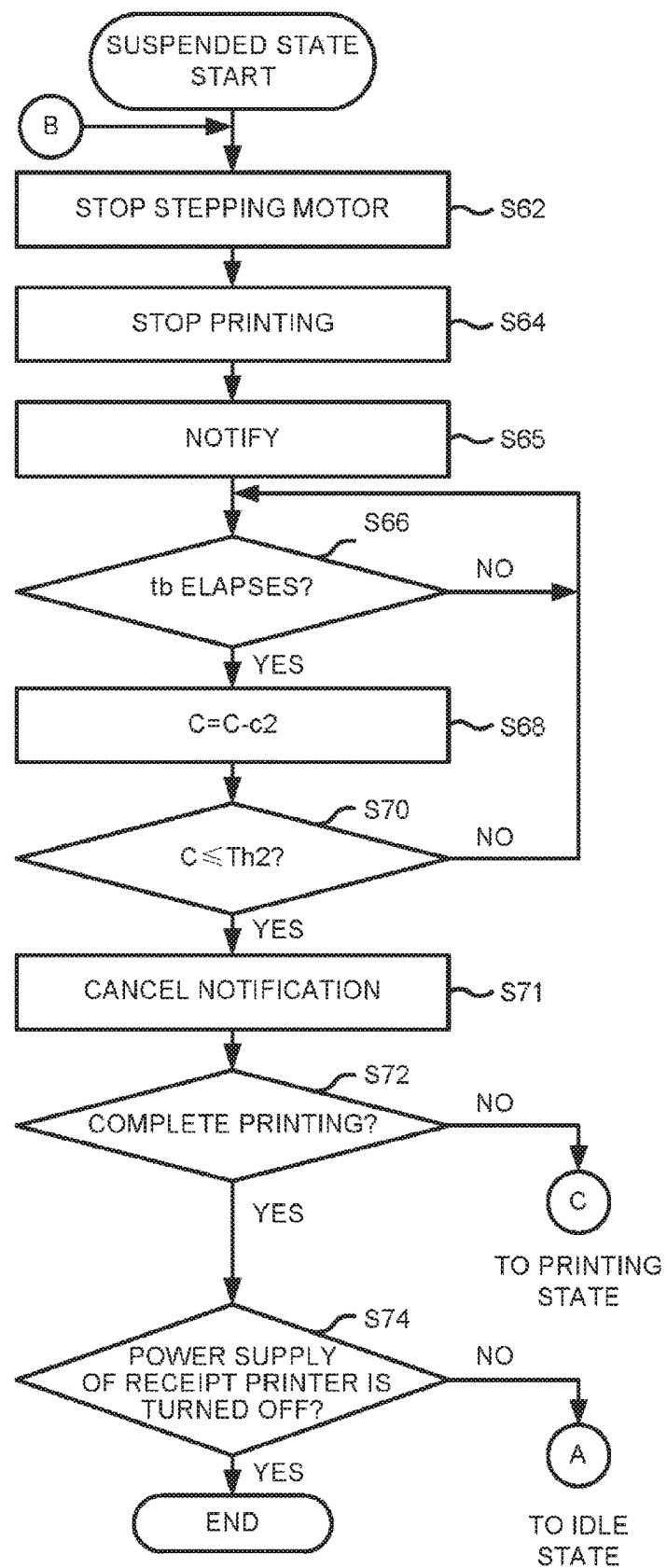
FIG. 11 is a flowchart depicting an example of a flow of a processing in a suspended state.

Next, the flow of the processing in the suspended state S is described with reference to FIG. 11. FIG. 11 is a flowchart depicting an example of the flow of the processing in the suspended state S. If the state of the receipt printer 10 shifts to the suspended state S, the motor stop determination section 54 stops the stepping motor 24 (Act S62).

Subsequently, the control section 30 (refer to FIG. 4) stops printing (printing of the receipt) (Act S64). Then, the motor temperature notifying section 66 notifies that the receipt printer 10 is in the suspended state S using the indicator 22 (Act S65).

The second clocking section 52b determines whether the second predetermined period of time tb elapses (Act S66). If it is determined that the second predetermined period of time tb has elapsed (Yes in Act S66), the flow proceeds to the processing in Act S68. On the other hand, if it is determined that the second predetermined period of time tb does not elapse (No in Act S66), the processing in Act S66 is repeated.

The counting control section 50 subtracts the second predetermined value c2 from the count value C (Act S68).

Subsequently, the counting control section 50 determines whether the count value C is equal to or smaller than the second threshold value Th2 (Act S70). If it is determined that the count value C is equal to or smaller than the second threshold value Th2 (Yes in Act S70), the flow proceeds to the processing in Act S71. On the other hand, if it is determined that the count value C is greater than the second threshold value Th2 (No in Act S70), the flow returns to the processing in Act S66.

In Act S71, the motor temperature notifying section 66 cancels the notification by the indicator 22.

Subsequently, the motor stop determination section 54 determines whether the printing is completed (Act S72). If it is determined that the printing has been completed (Yes in Act S72), the flow proceeds to the processing in Act S74. On the other hand, if it is determined that printing is not completed (No in Act S72), the state of the receipt printer 10 shifts to the printing state P (Act S22 in FIG. 9).

In Act S74, the power supply state detection section 60 determines whether the power supply of the receipt printer 10 is turned off. If it is determined that the power supply of the receipt printer 10 is turned off (Yes in Act S74), the processing in FIG. 11 is terminated. On the other hand, if it is determined that the power supply of the receipt printer 10 is not turned off (No in Act S74), the state of the receipt printer 10 shifts to the idle state I (Act S42 in FIG. 10).

As described above, according to the motor temperature estimation apparatus 19 of the embodiment, while the stepping motor 24 (motor) for conveying the thermal paper Q (paper) is being driven, the first clocking section 52a (first clocking module) outputs the instruction for adding the first predetermined value c1 to the count value C to the counting control section 50 (counting module) each time the first predetermined period of time to elapses. Then, when the count value C reaches the first threshold value Th1, the motor stop determination section 54 (determination module) stops the stepping motor 24. The second clocking section 52b (second clocking module) outputs the instruction for subtracting the second predetermined value c2 from the count value C to the counting control section 50 each time the second predetermined period of time tb elapses when the stepping motor 24 is stopped according to the determination by the motor stop determination section 54. Then, when the count value C falls below the second threshold value Th2, which is smaller than the first threshold value Th1, the motor drive resuming section 56 (resuming module) resumes the operation of the stepping motor 24. The third clocking section 52c (third clocking module) outputs an instruction for subtracting the third predetermined value c3 from the count value C to the counting control section 50 each time the third predetermined period of time tc elapses when the stepping motor 24 is stopped in a state in which the count value C is smaller than the first threshold value Th1. Therefore, with the count value C, the temperature of the stepping motor 24 for paper conveyance can be more accurately estimated without using a temperature sensor.

According to the motor temperature estimation apparatus 19 of the embodiment, the second predetermined period of time tb is set to be equal to the third predetermined period of time tc. Furthermore, the second predetermined value c2 is set to be smaller than the third predetermined value c3. Therefore, a subtraction amount of the count value C in the suspended state S can be smaller than that of the count value C in the idle state I. Therefore, in consideration that it takes more time to cool the stepping motor 24 in the suspended state S in which the temperature of the stepping motor 24 is higher with respect to the idle state I, more accurate temperature estimation can be performed.

Further, according to the motor temperature estimation apparatus 19 of the embodiment, the second predetermined value c2 is set to be equal to the third predetermined value c3. Furthermore, the second predetermined period of time tb is set to be longer than the third predetermined period of time tc. Therefore, the time the count value C is subtracted in the suspended state S can be smaller than the time the count value C is subtracted in the idle state I. Therefore, in consideration that it takes more time to cool the stepping motor 24 in the suspended state S in which the temperature of the stepping motor 24 higher with respect to the idle state I, more accurate temperature estimation can be performed.

According to the motor temperature estimation apparatus 19 of the embodiment, the stop time clocking section 62 (stop time clocking module) measures a stop time during which the receipt printer 10 (printer apparatus) provided with the motor temperature estimation apparatus 19 stops from the time the power supply of the receipt printer 10 is turned off to the time the power supply is turned on. Then, the counter reset section 64 (reset module) resets the count value C based on the stop time. Therefore, it is possible to prevent the count value C before the power supply is turned off from being stored when a long period of time has elapsed after the power supply of the receipt printer 10 is turned off. Therefore, the temperature estimation of the stepping motor 24 can be performed more accurately.

According to the motor temperature estimation apparatus 19 of the embodiment, the motor temperature notifying section 66 (notifying module) performs notification while the stepping motor 24 is stopped according to the determination by the motor stop determination section 54. Therefore, if it is determined that the stepping motor 24 is overheated and the operation is stopped, the accurate information can be provided to the operator of the receipt printer 10.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The control program P1 executed by the control section 30 may be provided by being stored in the storage section 32 or by being recorded in a computer-readable recording medium such as a CD-ROM, a FD (Flexible Disk), a CD-R, a DVD (Digital Versatile Disk) and the like in the form of installable or executable file. The control program P1 may be provided by being stored in a computer connected with a network and then being downloaded via the network. The control program P1 may be provided or distributed via the network such as the Internet.

What is claimed is:

1. A motor temperature estimation apparatus, which estimates a temperature of a motor for conveying a paper, comprising:
    a counting module configured to increase or decrease a count value in response to an instruction;
    a first clocking module configured to output an instruction for adding a first predetermined value to the count value to the counting module each time a first predetermined period of time elapses when the motor is driven;
    a determination module configured to stop the motor when the count value reaches a first threshold value;
    a second clocking module configured to output an instruction for subtracting a second predetermined value from the count value to the counting module each time a second predetermined period of time elapses when the motor is stopped according to a determination by the determination module;
    a resuming module configured to resume an operation of the motor when the count value based on the instruction from the second clocking module is smaller than a second threshold value which is smaller than the first threshold value; and
    a third clocking module configured to output an instruction for subtracting a third predetermined value from the count value to the counting module each time a third predetermined period of time elapses when the motor is stopped in a state in which the count value is smaller than the first threshold value.

2. The motor temperature estimation apparatus according to claim 1, wherein
    the second predetermined period of time is set to be equal to the third predetermined period of time, and
    the second predetermined value is smaller than the third predetermined value.

3. The motor temperature estimation apparatus according to claim 1, wherein
    the second predetermined value is equal to the third predetermined value, and the second predetermined period of time is longer than the third predetermined period of time.

4. The motor temperature estimation apparatus according to claim 1, further comprising:
a stop time clocking module configured to measure a stop time during which a printer apparatus provided with the motor temperature estimation apparatus stops from a time at which a power supply of the printer apparatus is turned off to a time at which the power supply is turned on; and
a reset module configured to reset the count value based on the stop time.

5. The motor temperature estimation apparatus according to claim 1, further comprising:
a notifying module configured to send a notification during a period in which the motor is stopped according to a determination by the determination module.

6. A method by a motor temperature estimation apparatus which estimates a temperature of a motor for conveying a paper, comprising:
increasing or decreasing a count value in response to an instruction;
outputting an instruction for adding a first predetermined value to the count value each time a first predetermined period of time elapses when the motor is driven;
stopping the motor when the count value reaches a first threshold value;
outputting an instruction for subtracting a second predetermined value from the count value each time a second predetermined period of time elapses when the motor is stopped according to a determination;
resuming an operation of the motor when the count value based on the subtraction instruction is smaller than a second threshold value which is smaller than the first threshold value; and
outputting an instruction for subtracting a third predetermined value from the count value each time a third predetermined period of time elapses when the motor is stopped in a state in which the count value is smaller than the first threshold value.

7. The method according to claim 6, wherein
the second predetermined period of time is equal to the third predetermined period of time, and
the second predetermined value is smaller than the third predetermined value.

8. The method according to claim 6, wherein
the second predetermined value is equal to the third predetermined value, and
the second predetermined period of time is longer than the third predetermined period of time.

9. The method according to claim 6, further comprising:
measuring a stop time during which a printer apparatus provided with a motor temperature estimation apparatus stops from a time at which a power supply of the printer apparatus is turned off to a time at which the power supply is turned on; and
resetting the count value based on the stop time.

10. The method according to claim 6, further comprising:
notifying during a period in which the motor is stopped according to a determination.

11. A printer, comprising:
a printing unit; and
a motor temperature estimation apparatus, which estimates a temperature of a motor for conveying a paper, comprising:
a counting module configured to increase or decrease a count value in response to an instruction;
a first clocking module configured to output an instruction for adding a first predetermined value to the count value to the counting module each time a first predetermined period of time elapses when the motor is driven;
a determination module configured to stop the motor when the count value reaches a first threshold value;
a second clocking module configured to output an instruction for subtracting a second predetermined value from the count value to the counting module each time a second predetermined period of time elapses when the motor is stopped according to a determination by the determination module;
a resuming module configured to resume an operation of the motor when the count value based on the instruction from the second clocking module is smaller than a second threshold value which is smaller than the first threshold value; and
a third clocking module configured to output an instruction for subtracting a third predetermined value from the count value to the counting module each time a third predetermined period of time elapses when the motor is stopped in a state in which the count value is smaller than the first threshold value.

12. The printer according to claim 11, wherein
the second predetermined period of time is set to be equal to the third predetermined period of time, and
the second predetermined value is smaller than the third predetermined value.

13. The printer according to claim 11, wherein
the second predetermined value is equal to the third predetermined value, and
the second predetermined period of time is longer than the third predetermined period of time.

14. The printer according to claim 11, further comprising:
a stop time clocking module configured to measure a stop time during which a printer apparatus provided with the motor temperature estimation apparatus stops from a time at which a power supply of the printer apparatus is turned off to a time at which the power supply is turned on; and
a reset module configured to reset the count value based on the stop time.

15. The printer according to claim 11, further comprising:
a notifying module configured to send a notification during a period in which the motor is stopped according to a determination by the determination module.

16. The printer according to claim 11, wherein
the printing unit comprises a thermal head and a platen roller.

17. The printer according to claim 11, wherein
the printer is a thermal printer.

18. The printer according to claim 11, wherein
the printer is a receipt printer.

19. The printer according to claim 11, wherein
the paper is roll paper.

20. The printer according to claim 11, wherein
the paper is thermal paper.

* * * * *